April 26, 1960  F. L. HAMILTON, JR  2,934,291
RELAY CONTROL CIRCUIT FOR AIRCRAFT TRIM TAB CONTROL
Filed Jan. 4, 1957
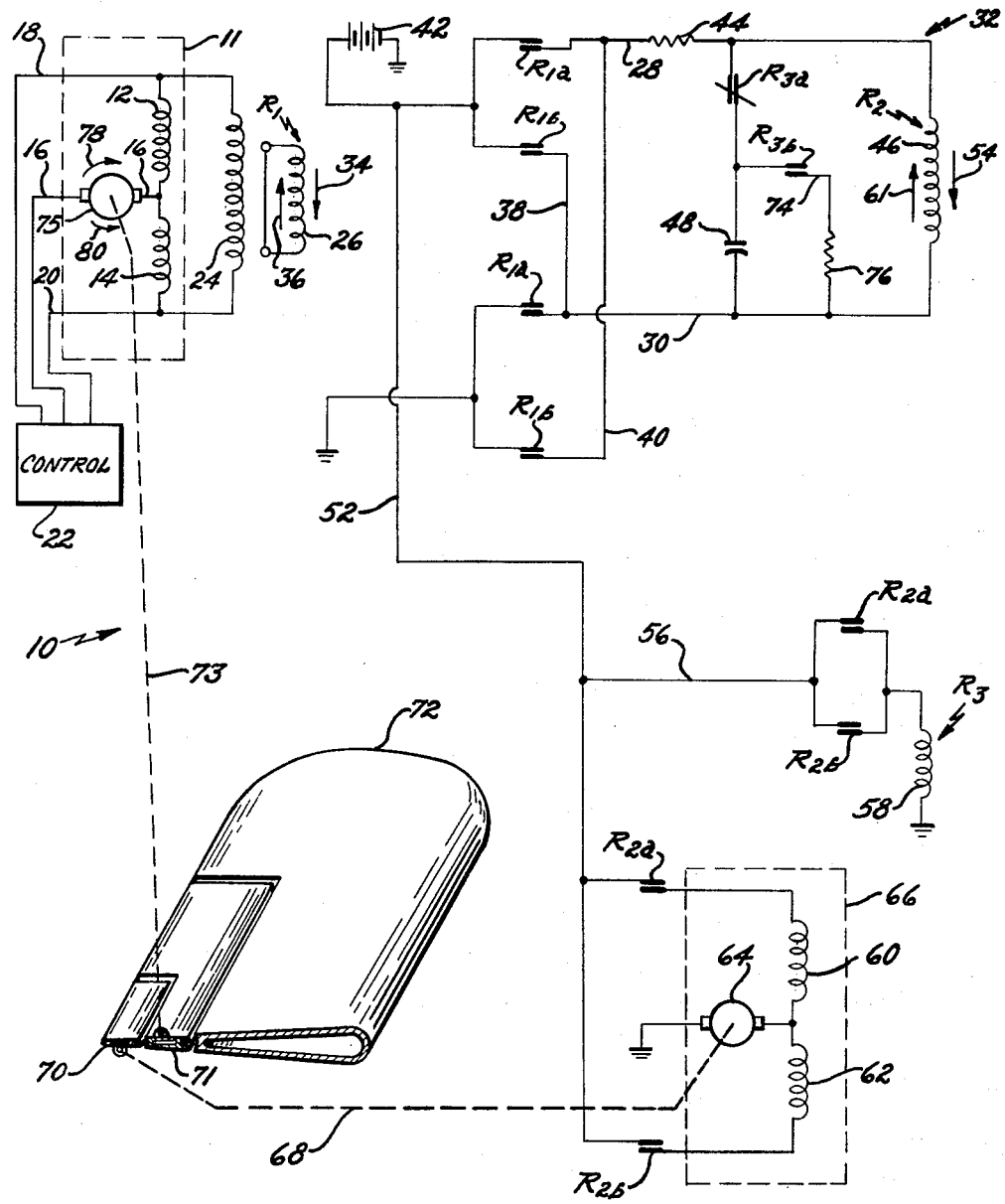
INVENTOR.
FITZHUGH L. HAMILTON, JR.
BY
ATTORNEYS

United States Patent Office 2,934,291
Patented Apr. 26, 1960

2,934,291

RELAY CONTROL CIRCUIT FOR AIRCRAFT TRIM TAB CONTROL

Fitzhugh L. Hamilton, Jr., Schenectady, N.Y., assignor to the United States of America as represented by the Secretary of the Air Force Application January 4, 1957, Serial No. 632,615

2 Claims. (Cl. 244—82)

This invention relates to relay circuits and more particularly to highly sensitive relay circuits for control operation of servo motors.

The present invention is particularly applicable to trim tab control on aircraft. At the present time servo motors for trim tab control are combined with circuits containing a relay to monitor the unbalance in the basic servo motor currents. When the unbalance in the servo motor currents is too great, the relay is caused to operate to run the trim tab actuator to correct for the unbalance. In the effort to achieve a proper trim condition the relay circuit is made sensitive to very small unbalance in the basic servo motor.

An important disadvantage to this high sensitivity is that the relay will pick up and chatter when the servo motor is tracking a signal. This means that the trim tab actuator is being continuously started and stopped. The result is an undesirably short life for both the trim tab actuator and for the relay contacts supplying the power to the trim tab actuator.

Attempts at correcting the above undesirable conditions have hereto been unsatisfactory in that other undesirable characteristics creep in. For example, one avenue of correction tried has been to delay the pickup of the relay. However, such delay in pickup has resulted also in undesirable delay in drawback of the relay as well. This would cause the trim tab actuator to make the tab over-shoot the proper position.

The present invention succeeds in avoiding such undesirable over-shooting of the trim tab and at the same time removes the high current problem which heretofore resulted in short life to relay contacts and trim tab actuator.

Accordingly, a primary object of the present invention is to provide a relay circuit arrangement for servo motor control which compensates for chatter of the monitor relay of a basic servo motor.

Another object is the provision of a relay circuit control system which requires sustained signals for its operation.

And another object is the provision of a relay servo circuit which discriminates against merely transient voltage signals.

These features, objects and advantages are achieved generally by providing, in addition to a monitoring relay for the basic servo motor, a pair of relays and a signal integrating circuit, the integrating circuit being in responsive relation to the monitoring relay and in control relation to the first relay of the pair and the second relay of the pair being in responsive relation to the operation of the first relay and in control relation to the integrating circuit.

By making the integrating circuit in the form of a capacitor in parallel with the winding of the first relay of the pair and in series with the monitor relay the first relay is made inoperable to transient signals which cause chatter in the monitor relay. By controlling the capacitance value in the parallel circuit the size of the sustained signal for operating the first relay is thereby controlled. By making the trim tab actuator operable from the first relay of the pair rather than from the monitor relay, the undesirable effect of chatter in the monitor relay on the trim tab actuator is effectively removed. By placing the second relay of the pair in position to discharge the capacitor and making the second relay operable from the first relay, the integrating circuit is effectively reset after each operating cycle.

These and other features, objects, and advantages will become more apparent from the following description taken in connection with the accompanying drawing and wherein:

Figure 1 is a schematic circuit representation of a preferred embodiment of the present invention.

Referring to Fig. 1 in more detail, a relay operating system for servo motor control is designated generally by the numeral 10. In the system 10 a basic servo motor 11 has field windings 12 and 14, both connected to a common line 16 at one end and a pair of input lines 18 and 20 respectively at each of the other ends for operation from a suitable control source as an automatic pilot or any suitable control 22. Also across the lines 18 and 20 is a winding 24 inductively coupled to a winding 26 of a relay $R_1$. The relay $R_1$ may be of the balanced armature type with two pairs of normally open contacts $R_{1a}$ and $R_{1b}$ which are arranged to selectively close, depending on the direction of the field from current flow in the relay winding 26. For example, the pair of contacts $R_{1a}$ in the lines 28 and 30 respectively, in the relay control circuit 32, may be arranged to close when the field in the winding 26 is in the direction 34. Conversely, when the field in the relay winding 26 is in an opposite direction 36 the contacts $R_{1b}$, in lines 38 and 40 respectively, will close. If desired, the winding 26 may be used directly across the windings 12 and 14 in place of the winding 24 which is used in the present instance to provide a small signal time lag. The line 28 is connected through one of the relay contacts $R_{1a}$ and the positive terminal of a power source such as a battery 42 to ground. Line 28 is also connected through a resistor 44, a winding 46 of another relay $R_2$ which may also be of the balanced armature type and having two pairs of normally open contacts $R_{2a}$ and $R_{2b}$ to the line 30 leading through the other of the contacts $R_{1a}$ to ground. A capacitor 48 is connected in parallel across the winding 46 of the relay $R_2$.

The line 28 is also connected through the line 40 and one of the contacts $R_{1b}$ to ground, while the line 30 is also connected through the other of the relay contacts $R_{1b}$ to the power source 42.

The power source 42 is further connected through a line 52, one of the contacts $R_{2a}$, a motor winding 60 and armature 64 to ground. The line 52 is also connected through a line 56 and the other of the contacts $R_{2a}$ through a third relay winding 58 of a third relay $R_3$, having one set of normally open and one set of normally closed contacts $R_{3a}$ and $R_{3b}$ respectively to ground. One of the contacts $R_{2b}$ is also connected in the line 56 in parallel with the contacts $R_{2a}$. The line 52 is also connected through the other of the contacts $R_{2b}$, another motor winding 62 and the armature 64 to ground.

The contacts $R_{2a}$ and $R_{2b}$ are normally open and arranged so that they are selectively closed depending on the direction of the field at the relay winding 46 from current flow therein. For example, when the field of the relay winding 46 is in the direction 54 the contacts $R_{2a}$ may be caused to close, and when the field of the relay winding 46 is in the opposite direction 61, the contacts $R_{2b}$ may be caused to close. It will be noted that the closing of either the contacts $R_{2a}$ or $R_{2b}$ will cause the relay $R_3$ to be energized. The windings 60 and 62 are for actuation of a trim tab actuating motor armature 64 selectively in one and the opposite directions in the trim tab actuator 66. The armature 64 is connected by a suitable linkage or power transmitting mechanism 68 to a trim tab 70 pivotally mounted to a control section as an aileron, elevator, or rudder 71 on an aircraft airfoil section 72. The control section 71 is connected by a suitable linkage or power transmitting mechanism 73 to an armature 75 of the basic servo motor 11 for movement of the section 71. When current flows through the winding 58 of the relay $R_3$ it simultaneously opens contacts $R_{3a}$ and closes contacts $R_{3b}$ to close a capacitor discharging circuit formed by a line 74 connected from a point between the contacts $R_{3a}$ and the capacitor 48 through a resistor 76 to the line 30.

In operation, under the control of the automatic pilot 22 current flow through the windings 12 and 14 is regulated to rotate the armature 75 selectively in one direction 78 or the opposite direction 80 to pivot the control sections 71 to a desired control position. This desired position is then maintained by suitable signals from the automatic pilot 22. The desired holding condition exists when balanced voltages in the lines 18 and 20 from the automatic pilot 22 maintains a stationary armature. However, varying airflow conditions over the airfoil section 72 varies the forces on the control section 71. This in turn is transmitted through the linkage 73 to the armature 75 where an unbalanced condition is effected between the lines 18 and 20. This unbalanced condition in turn causes current to flow in the winding 24 to energize the relay $R_1$ in selective manner to cause the system 32 to move the trim tab 70 to counteract the forces on the control section 71 and thereby restore the balanced voltage conditions in the lines 18 and 20 in the basic servo motor 11. For example, if the forces on the control section 71 are downward, it may cause an unbalance condition in lines 18 and 20 such that the resultant current flow in the winding 24 effects a field direction 34 in the relay $R_1$. This may cause the relay contacts $R_{1a}$ to close. When the contacts $R_{1a}$ close current will flow from the power source 42 through the line 28, resistor 44, the winding 46 and the line 30 to ground. Current will also begin to flow through the contacts $R_{3a}$ to charge the capacitor 48. This will tend to initially minimize current flow in the windings 46 of relay $R_2$ and to build a potential in the capacitor 48. The current through the winding 26 will, therefore, initially be of insufficient magnitude to operate the relay $R_2$. If the unbalance in the basic servo motor 11 is of sufficient duration, the capacitor 48 will become charged and the current through the winding 46 of relay $R_2$ will be sufficiently great to close contacts $R_{2a}$.

The closing of contacts $R_{2a}$ will cause current to flow from the power source 42 through the line 52 and the winding 60 of the trim tab actuator 66 to cause the motor armature 64 to rotate in a direction to cause the linkage 68 to move the trim tab 70 downwardly to create a counteracting air flow force on the control section 71. At the same time current will flow through the line 52 and the winding 58 of the relay $R_3$ so as to actuate the relay $R_3$. Such actuation of the relay $R_3$ causes the contacts $R_{3a}$ to open and the contacts $R_{3b}$ in the line 74 to close so as to discharge the capacitor 48. The discharge of the capacitor 48 thereby prevents a delay in the opening of the contacts $R_{2a}$ when contacts $R_{1a}$ open. Thereby, over-shooting by the armature 64 of the trim tab actuator 66 is prevented.

Conversely, in correcting for an opposite type of unbalance, as when resulting forces on the control section 71 are in an upward direction, the field at the relay $R_1$ will be in the direction 36 from the resulting unbalance of the basic servo motor 10. Relay $R_1$ will thereby be actuated to close the contacts $R_{1b}$. In this case the closing of contacts $R_{1b}$ will cause current to flow from the power source 42 through the line 38, the line 30, the winding 46 of relay $R_2$ in the direction 61, the resistor 44, line 28, line 40 and $R_{1b}$ in line 40 to ground. This current will tend to charge the capacitor 48 in opposite direction to that previously discussed above. If the contacts $R_{1b}$ are closed for a sufficient time, the capacitor 48 will become charged and the current through the relay winding 46 in the direction 61 will be sufficiently great to close the contacts $R_{2b}$. The closing of the contacts $R_{2b}$ will cause current to flow from the power source 42 through the line 52, the contacts $R_{2b}$ at the trim tab actuator 66 and the winding 62 to rotate the motor armature 64 in a direction opposite to that previously discussed. This will actuate the linkage 68 to move the trim tab 70 upwardly to thereby create air flow forces counteracting those on the control section 71. At the same time current will flow from the power source 42 through line 52, the line 56, contacts $R_{2b}$ in the line 56, and the winding 58 of the relay $R_3$ so as to open the contacts $R_{3a}$ and close the contacts $R_{3b}$ in the line 74. The closing of the contacts $R_{3b}$ in the line 74 again causes a discharging of the capacitor 48 thereby preventing a delay in the opening of the contacts $R_{2b}$ when the contacts $R_{1b}$ of the monitor relay $R_1$ open. With the capacitor 48 discharged, as described, the armature 64 and thereby the trim tab 70 is prevented from overshooting in this corrective operation.

It will be noted that, because of the capacitor 48, transient signals in lines 28 and 30 caused by fluttering or brief closing of the relay contacts $R_{1a}$ and $R_{1b}$ will be prevented from actuating the relay $R_2$. By selecting the capacity of the capacitor 48, the amount or size of the sustained unbalance in the servo motor 10 required to actuate the relay $R_2$ may be controlled.

It is seen that while the relay $R_1$ may still involve flutter in the contacts $R_{1a}$ and $R_{1b}$, the amount of current involved is small and contact life is therefore greatly increased. Also, the flutter in the contacts of the relay $R_1$ has no effect on the current in the actuator 66. Because of the relay $R_2$, the trim tab actuator 66 will operate only when a sustained unbalance in the servo motor 11 is sufficient to actuate the relay $R_2$.

This invention is not limited to the specific details shown and described as equivalents will suggest themselves to those skilled in the art.

What is claimed is:

1. A control apparatus for a trim tab mounted on the control surface of an air foil section, said apparatus including, in combination with said trim tab and control surface, a current-operated servo motor operatively connecting with said control surface to move it in one direction or the opposite direction, depending upon the direction of current flow in said servo motor, when the circuit conducting the operating current for said motor becomes unbalanced and thus produces current flow in accordance with the direction of unbalance, a relay coupled to said servo motor for monitoring unbalance in said operating current, a trim tab actuator coupled to the trim tab, energizing means coupled to said actuator for selective movement of said trim tab in one and the opposite direction, means including an operating relay in responsive relation to said monitoring relay for making circuit between the trim tab actuator and energizing means to move the trim tab in one of said directions determined by the direction of unbalance in the servo motor current, and means coupled to said operating relay for confining response of the operating relay to sustained unbalance at the monitoring relay.

2. A control apparatus for a trim tab mounted on the control surface of an air foil section, said apparatus including, in combination with said trim tab and control surface, a current-operated servo motor operatively connecting with said control surface to move it in one direction or the opposite direction, depending upon the direction of current flow in said servo motor, when the circuit conducting the operating current for said motor becomes unbalanced and thus produces current flow in accordance with the direction of unbalance, an actuator coupled to said trim tab, for operation thereof an electric power supply means, said power supply means including normally open first and second circuits, the first circuit coupled to the actuator for supplying power for movement of the trim tab selectively in a trim direction reducing the servo unbalance, the second circuit coupled to an operating relay having relay contacts in said first circuit for closing said first circuit during periods of actuation of said operating relay, a monitoring relay means across said servo motor for monitoring power unbalance at said servo motor and having contacts in said second circuit for closing said second circuit to the operating relay during periods of monitored unbalance at the monitoring relay, a capacitor across said operating relay for confining said relay actuation to sustained unbalance at said monitoring relay, and a capacitor discharging relay means in responsive relation to said operating relay for discharging said capacitor upon actuation of said operating relay.

References Cited in the file of this patent

UNITED STATES PATENTS

| | | |
|---|---|---|
| 2,101,166 | Crago | Dec. 7, 1937 |
| 2,362,570 | McCleery | Nov. 14, 1944 |
| 2,435,440 | Graham | Feb. 3, 1948 |
| 2,546,555 | Meredith et al. | Mar. 27, 1951 |
| 2,809,000 | Brannin et al. | Oct. 8, 1957 |
| 2,850,691 | Bulovic | Sept. 2, 1958 |

FOREIGN PATENTS

| | | |
|---|---|---|
| 635,971 | Germany | Sept. 28, 1936 |